(12) United States Patent
Kobayashi

(10) Patent No.: US 9,423,811 B2
(45) Date of Patent: Aug. 23, 2016

(54) METHOD OF AUTOMATIC MODE CHANGE IN SWITCHING REGULATORS

(71) Applicant: Dialog Semiconductor GmbH, Kirchheim/Teck-Nabern (DE)

(72) Inventor: Hidenori Kobayashi, Kawasaki (JP)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 136 days.

(21) Appl. No.: 13/790,461

(22) Filed: Mar. 8, 2013

(65) Prior Publication Data

US 2014/0247027 A1  Sep. 4, 2014

(30) Foreign Application Priority Data

Mar. 4, 2013  (EP) ..................... 13368006

(51) Int. Cl.
| | |
|---|---|
| G05F 1/00 | (2006.01) |
| G05F 1/595 | (2006.01) |
| H02M 3/158 | (2006.01) |
| H02M 1/00 | (2006.01) |

(52) U.S. Cl.
CPC ............. *G05F 1/595* (2013.01); *H02M 3/158* (2013.01); *H02M 2001/0016* (2013.01); *H02M 2001/0025* (2013.01); *H02M 2001/0032* (2013.01); *Y02B 70/16* (2013.01)

(58) Field of Classification Search
USPC .......... 323/222, 223, 271, 282, 283, 284, 285
See application file for complete search history.

(56) References Cited

U.S. PATENT DOCUMENTS

| | | | |
|---|---|---|---|
| 6,166,527 A * | 12/2000 | Dwelley et al. | ............... 323/222 |
| 8,009,090 B2 | 8/2011 | Vishin et al. | |
| 8,112,644 B2 | 2/2012 | Huang et al. | |
| 8,135,966 B2 | 3/2012 | Rozen et al. | |
| 8,181,051 B2 | 5/2012 | Barth | |
| 8,238,868 B2 | 8/2012 | Duan et al. | |
| 8,310,220 B2 * | 11/2012 | Takahashi | ............... H02M 1/36 323/283 |
| 2002/0194516 A1 | 12/2002 | Muratov et al. | |
| 2004/0145242 A1 | 7/2004 | Rodriguez et al. | |
| 2006/0203814 A1 | 9/2006 | Ye et al. | |
| 2010/0026262 A1* | 2/2010 | Sase et al. | ..................... 323/283 |
| 2012/0007661 A1 | 1/2012 | Hur | |
| 2012/0133346 A1* | 5/2012 | Ogawa | ............... H02M 3/1588 323/282 |
| 2012/0299564 A1 | 11/2012 | Howes et al. | |

OTHER PUBLICATIONS

European Search Report 13368006.6-1809 Mailed: Aug. 14, 2013, Dialog Semiconductor GmbH.

* cited by examiner

*Primary Examiner* — Nguyen Tran
(74) *Attorney, Agent, or Firm* — Saile Ackerman LLC; Stephen B. Ackerman

(57) ABSTRACT

A switching regulator with an output high threshold voltage setting and an output low threshold voltage setting that permits a plurality of different operating modes to be established. Combined with these two threshold voltages is the ability to adjust both threshold voltages over the full range of the regulator output voltage, which yields switching regulator modes of forced normal operation, automatic where the operating mode is dependent upon output current and forced sleep mode.

8 Claims, 5 Drawing Sheets

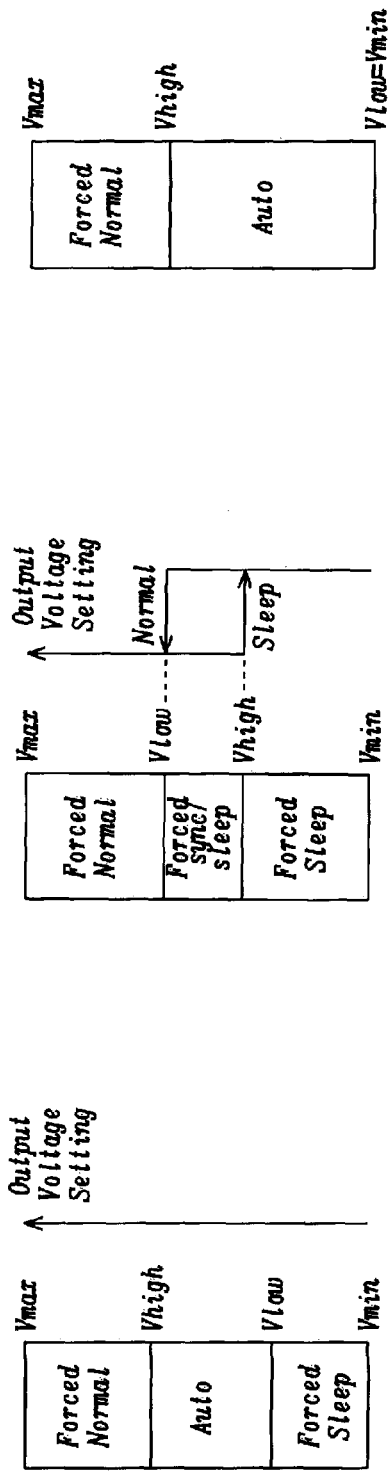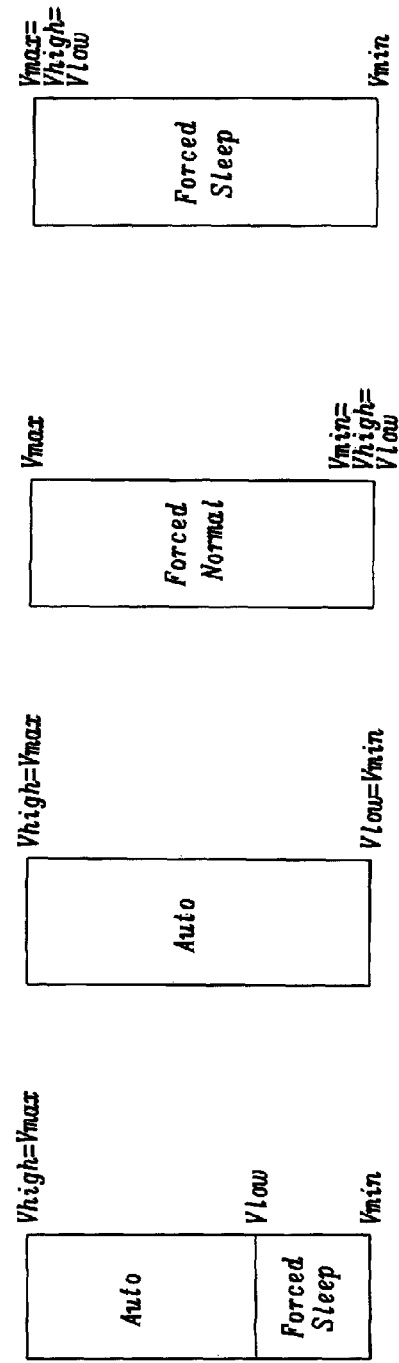

Boost

Buck

Buck-Boost

METHOD OF AUTOMATIC MODE CHANGE IN SWITCHING REGULATORS

TECHNICAL FIELD

The present disclosure is related to switching regulators and more particularly to changing modes to maximize performance or to conserve energy.

BACKGROUND

Switching regulators used in portable applications usually have two modes, a normal mode and a mode for light load conditions. In the normal mode the output stage of the regulator is always switching by pulse width modulation (PWM) or equivalent. The normal mode can deliver high output current and maximize performance. In the light load mode the output of the switching regulator is switching intermittently reducing power consumption to improve power conversion efficiency. An automatic mode change function improves the usability of the switching regulator, wherein output current less than a given threshold automatically places the regulator into a light load mode to save power consumption. If the output current is above the given threshold, the regulator changes to a normal mode for maximum current and performance.

DC to DC converters have the capability to change output voltage dynamically to improve system efficiency by using dynamic voltage control (DVC) or dynamic voltage scaling (DVS). The most popular application of either the DVC or the DVS is in powering an application processor or an RF amplifier in a portable device, wherein a regulator supplies high voltage to maximize performance or the regulator is operated in a low power mode where the regulator supplies a lower voltage and operating at a lower power consumption state.

Some switching regulators have both the automatic mode change and the DVS/DVC capability. A certain delay is required to accommodate current sensing thus causing automatic mode change based on output current to take time, thus changing the mode in advance maximizes the response of the regulator to a change output mode or condition. To achieve a mode change in advance, some converters have an output voltage threshold as well as an output current threshold and when the output voltage target is low, the converter goes to light load quickly.

US 2012/0007661 (Hur) is directed to an apparatus and method for determining dynamic voltage scaling mode and apparatus and a method for pumping voltage using the same. In US 2012/0299564 (Howes et al.) a low drop-out voltage regulator is directed to minimizing power consumption of a load circuit by dynamically adjusting the output voltage. U.S. Pat. No. 8,238,868 B1 (Duan et al.) is directed to a dynamic voltage scaling system for packet based data communications transceiver including a constant and variable voltage supply and a voltage control unit. U.S. Pat. No. 8,181,051 B2 (Barth) is directed to an electronic apparatus and method for conserving energy comprising an energy-conservation module to control the use of one or more energy-saving mechanisms. In U.S. Pat. No. 8,135,966 B2 (Rozen et al.) a device and method of power management is directed to providing at least one clock signal and one supply voltage in response to the long term and the short term supply parameters. U.S. Pat. No. 8,112,644 B2 (Huang et al.) is directed to a dynamic voltage scheduling method that executes at least one of several steps for sporadic and hard real time tasks with resource sharing. U.S. Pat. No. 8,009,090 (Vishin et al.) is directed to a system and method to dynamically vary supply voltages and clock frequency to perform dynamic voltage scaling for a GPS receiver.

In each application and system design the automatic mode change requirements and voltage threshold vary from user to user causing the regulator design to be modified frequently and adding to product cost. A scheme is needed that is flexible with few parameters and can be used in a wide variety of applications without design modifications.

SUMMARY

It is an objective of the present disclosure to accommodate a wide variety of applications with one regulator design by having one high voltage threshold, one low voltage threshold and capability of trimming the high and low voltage thresholds after fabrication.

It is also an objective of the present disclosure to be able to trim the high and low voltage thresholds by using OTP device (one time programmable device), EEPROM (Electrically Erasable Programmable Read-Only Memory), or a fuse after fabrication, or make a modification using an i2C interface or any other digital interface.

Within the present disclosure there is a "normal operating mode" also known as "sync" mode and a "light load operating mode" also known as "sleep" mode. The regulator of the present disclosure has one or two threshold parameters that can be adjusted or trimmed. If the output voltage of a regulator of the present disclosure is higher than the high threshold voltage (Vhigh) the regulator is in forced sync mode (normal operating mode) regardless of the output current. If the output voltage of the regulator is below a low voltage threshold (Vlow), the regulator is forced into sleep mode regardless of the output current. With only two parameters and an ability to adjust the value of the two parameters, the regulator can have seven different behavioral configurations of the automatic mode change.

The first of seven behavioral configurations is "forced sleep, automatic and forced normal" (FIG. 1A), wherein when the output voltage is greater than Vhigh the regulator goes into the normal mode regardless of output current, or when the output voltage is lower than Vlow, the regulator enters sleep mode. In between Vhigh and Vlow the regulator is in automatic mode and the operation is decided by the output current. The second behavioral configuration is forced sync and forced sleep with hysteresis (FIG. 1B), wherein Vlow>Vhigh and when the output voltage is less than Vhigh the regulator enters sleep mode. When the output of the regulator is greater than Vlow the regulator enters normal mode regardless of output current. The region between Vhigh and Vlow becomes a hysteresis voltage of the mode change between normal and sleep modes.

A third configuration is forced normal and automatic mode (FIG. 1C), wherein Vlow is set to a minimum value, removing a forced sleep mode, and an output voltage of the regulator set higher than Vhigh places the regulator in the sync mode regardless of output current. When the output of the regulator is less than Vhigh the mode is decided according to the output current of the regulator. A fourth configuration is forced sleep and automatic mode (FIG. 1D), wherein Vhigh is set to a maximum value, removing the forced normal mode, and wherein output voltage above Vlow puts the regulator into automatic mode, wherein the operation mode is decided according to the output current, and the regulator is placed into sleep mode if the output voltage is less than Vlow.

A fifth configuration that can be created is automatic only (FIG. 1E), wherein Vhigh is set to a maximum value and Vlow is set to a minimum value. The mode is decided by the regulator depending on the regulator output current. In the sixth configuration both Vhigh and Vlow are set to a minimum voltage value (FIG. 1F) forcing the regulator into the normal mode regardless of output current of the regulator. In the seventh configuration both Vhigh and Vlow are set to the maximum voltage (FIG. 1G) placing the regulator into the sleep mode regardless of output current.

BRIEF DESCRIPTION OF THE DRAWINGS

This disclosure will be described with reference to the accompanying drawings, wherein:

FIG. 1A through FIG. 1G of the present disclosure shows the various modes that can be created in a switching regulator by two threshold voltages;

DETAILED DESCRIPTION

Figure 2:
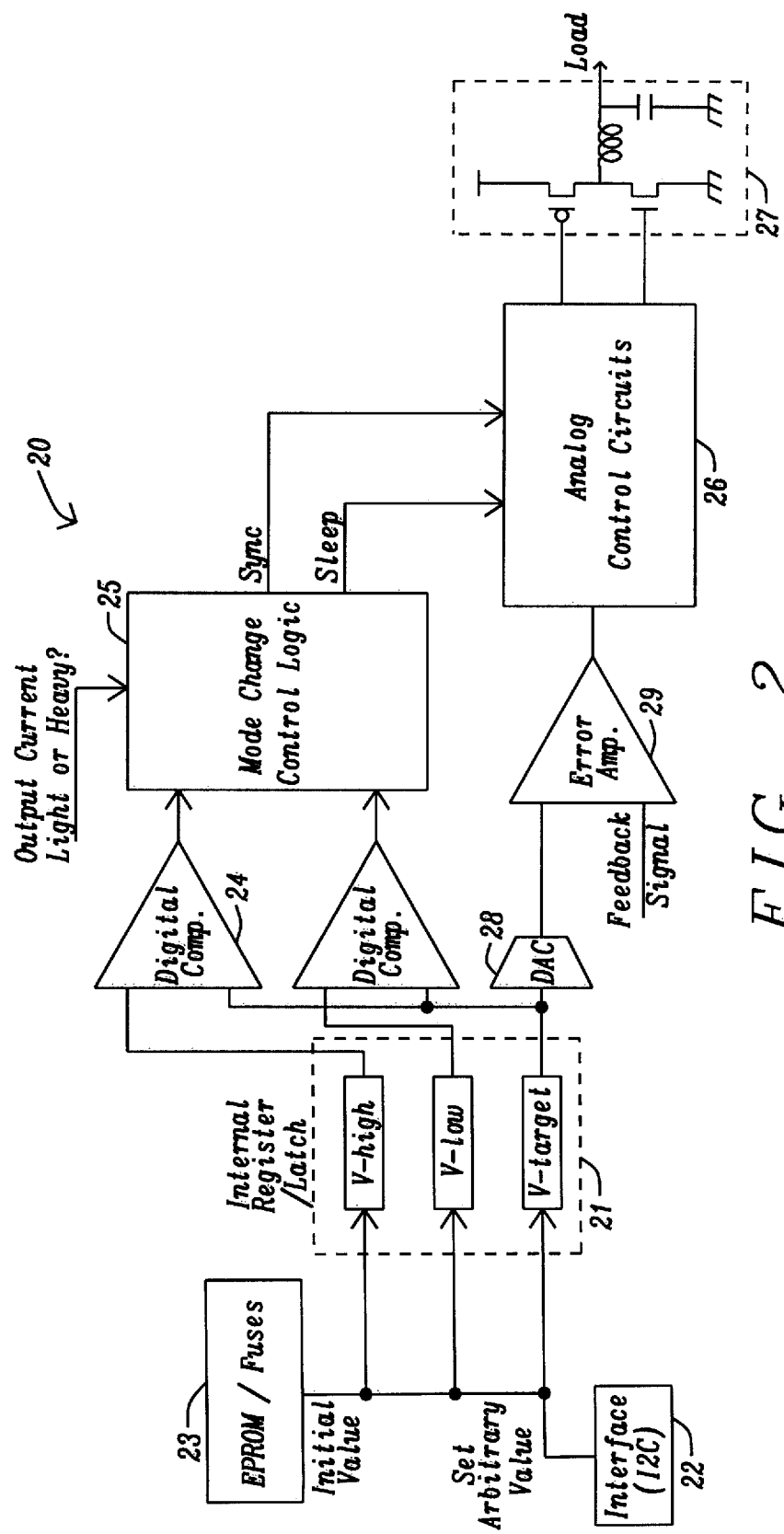
FIG. 2 is a block diagram of a switching regulator of the present disclosure of a buck type regulator, wherein input reference voltages are digital signals.

FIG. 1A through 1G show different operating modes of a switching regulator, or equivalent, wherein all diagrams of the operating modes are shown as a linear progression of a regulator output from a minimum output voltage to a maximum output voltage, except FIG. 1B where Vlow is greater than Vhigh which causes a hysteresis effect between Vmin and Vmax. Threshold voltages Vhigh and Vlow are adjusted to different values in the voltage range Vmin to Vmax to establish different modes of operation. There are three different operating modes, sleep, automatic and normal. In the sleep mode the regulator is operated at low power to conserve energy when the circuitry supported by the regulator is not being used. In the automatic mode the operation is determined by the output current of the regulator, and in the normal mode the output of the regulator is a constant voltage delivered at a wide range of currents. In automatic mode there are at least two current conditions which dictate a mode, high current for a normal operation and low current for a sleep condition operation. These two conditions in the automatic operating mode are relative and application dependent, which defined by a relative value of current and not defined by a specific current value.

In FIG. 1A where Vmax>Vhigh>Vlow>Vmin, if the output voltage setting, or the output voltage target, of the regulator is between voltages, Vmax and Vhigh, the regulator is in a forced sync/normal mode and if the output voltage setting, or the output voltage target, is between voltages, Vlow and Vmin, the regulator is in a forced sleep mode. Between threshold voltages Vhigh and Vlow the switching regulator is in an automatic mode, wherein the operating mode is decided by the output current.

In FIG. 1B Vmax>Vlow>Vhigh.>Vmin sets up a condition where there is a hysteresis caused by Vlow being greater than Vhigh. Above Vlow is the forced sync/normal mode and below Vhigh is the forced sleep mode. Between Vhigh and Vlow is a hysteresis in which the sleep mode is maintained as the output voltage is increase from Vmin, past Vhigh and then past Vlow. Similarly the sync/normal mode is maintained as the output voltage is decreased from Vmax past Vlow to Vhigh where the mode changes to the forced sleep mode when the voltage passes the Vhigh threshold. The hysteresis is useful in avoiding mode bounce where the voltage setting is close to the mode change threshold causing the device to go back and forth between the two modes.

FIG. 1C shows the mode setting when Vmax>Vhigh>Vlow=Vmin. Since Vlow equals Vmin there is no forced sleep mode. Above Vhigh is the forced sync/normal mode and below Vhigh is the automatic mode where the operation mode is decided by the output current.

In FIG. 1D Vhigh equals Vmax and Vhigh>Vlow>VminIn. This creates two operating modes, automatic mode between Vlow and Vmax and forced sleep mode between Vlow and Vmin. In FIG. 1E Vhigh is set to Vmax and Vlow is set to Vmin, which sets the switching regulator in the automatic mode for the full range of the output voltage of the regulator. In FIG. 1F Vhigh equal Vlow and both equal Vmin, this places the entire regulator output from Vmax to Vmin in a forced sync/normal operating mode, and in FIG. 1G Vhigh equals Vlow and both equal Vmax, which places the entire regulator output from Vmin to Vmax in a forced sleep mode.

In FIG. 2 is a block diagram of an exemplary switching regulator 20, or converter, where the input is digital including the output voltage target (V-Target), threshold voltages Vhigh (V-high) and Vlow (V-low) are all held in internal registers 21, or latches. Sources of the digital signals are from digital interfaces, for example I2C interface 22, an EPROM and/or fuses 23. A digital compare circuit 24 is used to compare V-high with the target digital value (V-target) and to compare V-low with the target digital value. These two digital compare circuits 24 provide an input to the mode change control logic 25 to provide a sync/normal threshold signal and a sleep threshold signal to the analog control circuits 26 that drive the buck driver circuit 27 connected to the load.

The initial default digital values are loaded from the EPROM or fuse circuit at startup of the regulator. The digital value of the V-target signal is dynamically changed or updated through the external interface i2C, or equivalent, and V-target is converted to an analog signal with a DAC 27 and applied to an error amplifier 28. The analog switch control regulates the analog output voltage to the V-target signal. V-target is always compared to V-high and V-low to decide the converter/regulator mode depending upon the outputs of the two comparators.

The exemplary switching regulator of FIG. 2 discussed herein has a buck type driver circuit coupled between the load and the analog control circuit 26, which in effect provides a step down DC to DC switching regulator. It should be understood that the techniques discussed herein can also be applied to a boost and a buck-boost style regulator where the boost type output driver is adapted to the switching regulator and provides a boosted output voltage, or the buck-boost type driver circuit that provides an inverted output voltage in a step up/step down driver stage. Further, there are variations of the switching regulator where a portion of the input circuitry is analog affecting signal management to produce a comparable switching regulator. However, the use of adjustable threshold voltages to determine the operating mode of the regulator remains consistent across the variations in the design and style of the various switching regulators.

Figure 3:
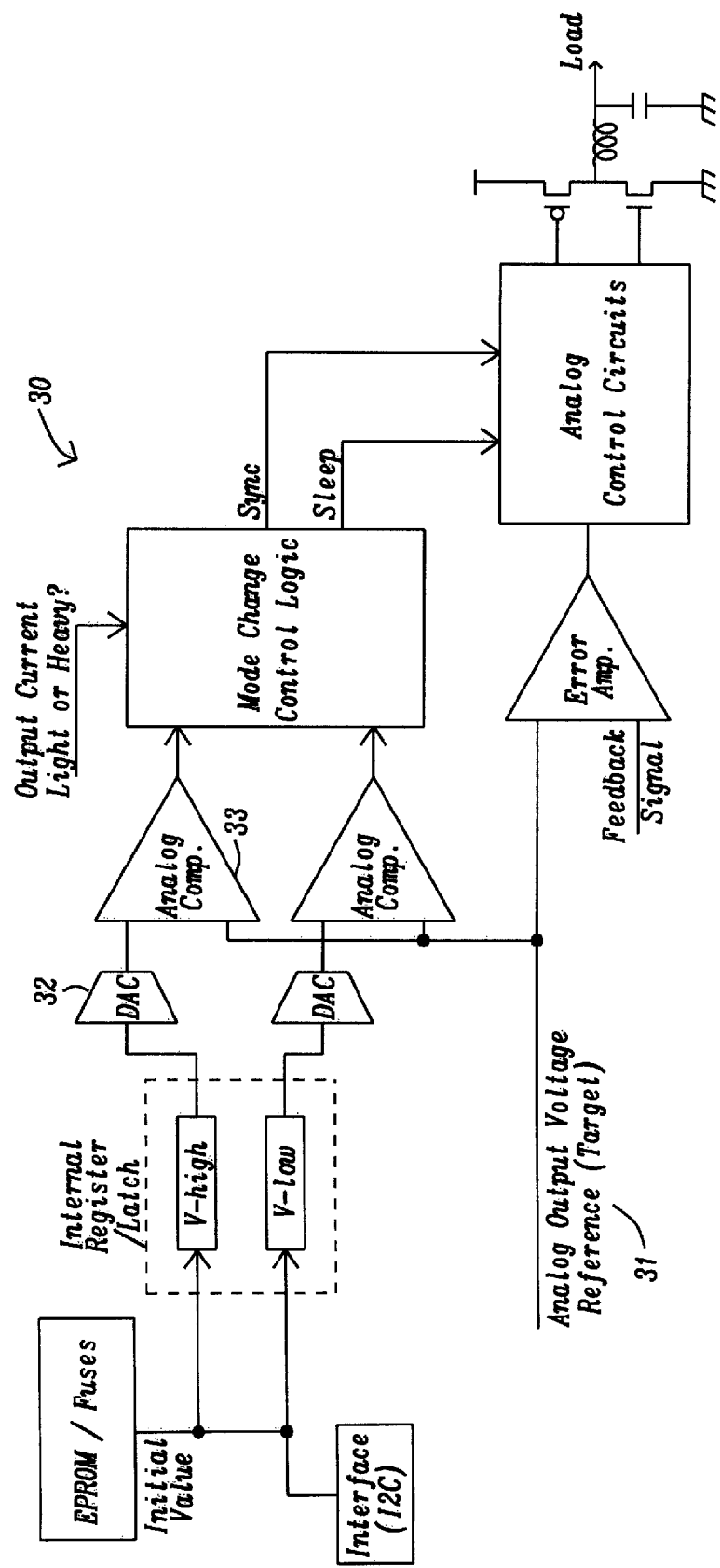
FIG. 3 Is a block diagram of a switching regulator of the present disclosure, wherein the target input voltage is an analog signal.

In FIG. 3 is shown a regulator 30 that is a variation of the regulator 20 in FIG. 2. In regulator 30 the target value 31 is analog which necessitates analog compare circuits. Since V-high and V-low are digital signals a DAC 32 is required to connect the digital V-high and V-low signals to the analog compare circuits 33.

Figure 4:
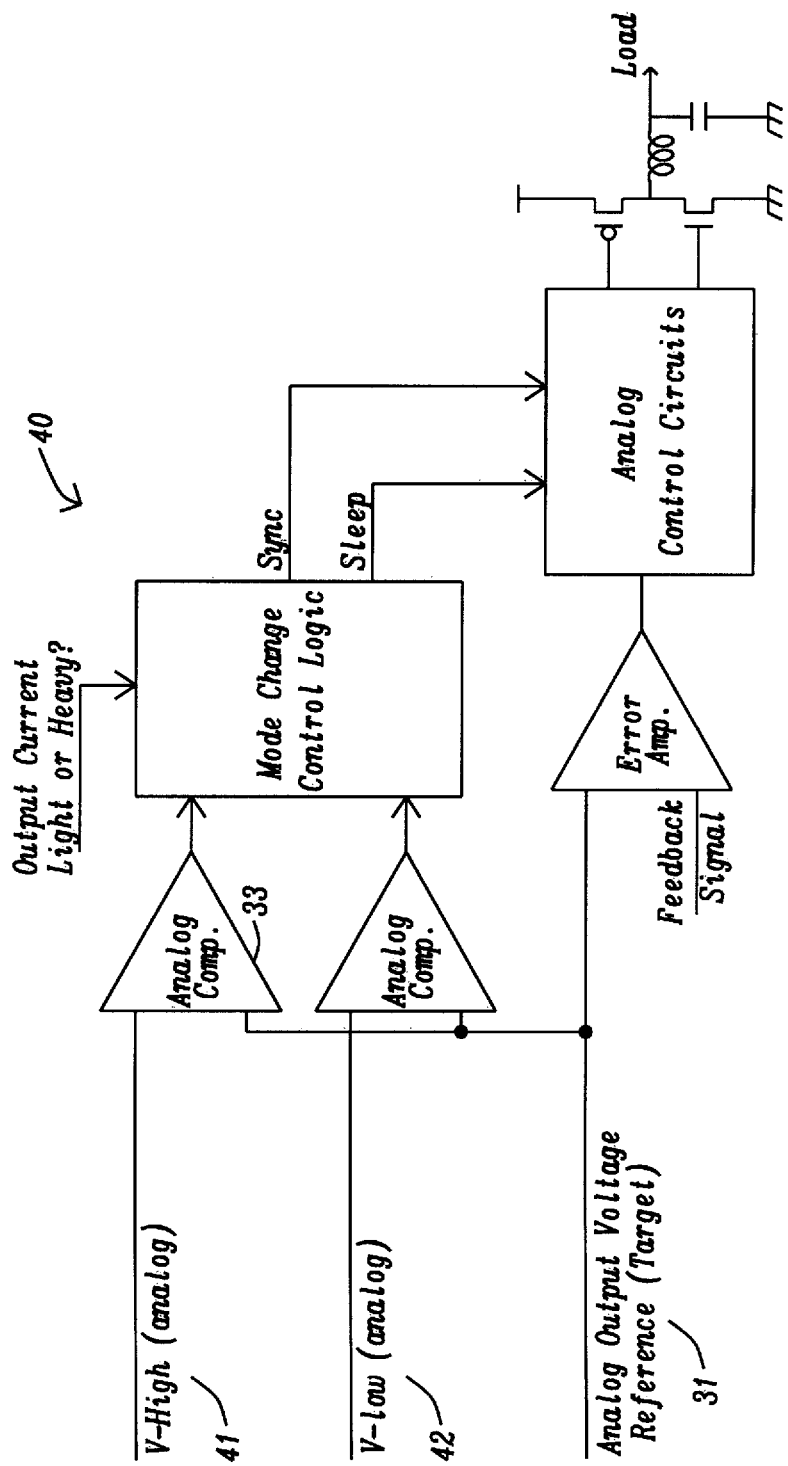
FIG. 4 is a block diagram of a switching regulator of the present disclosure, wherein input reference voltages are analog voltages.

Shown in FIG. 4 is a regulator 40 in which the threshold voltages V-high 41 and V-low 42 are analog signals along with the target voltage 31. The digital circuitry required for regulators 20 and 30 is no longer required leaving regulator 40 more susceptible to process and device variations.

Figure 5A:
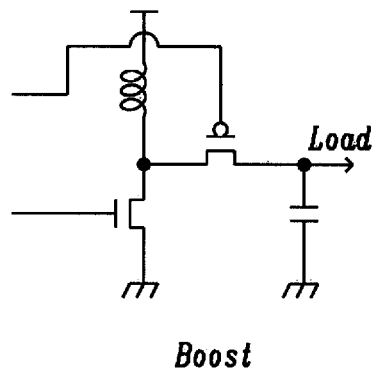
FIG. 5A, FIG. 5B and FIG. 5C are circuit diagrams of output stages for the switching regulator of the present disclosure.
Figure 5B:
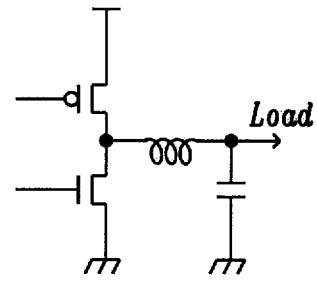
Figure 5C:
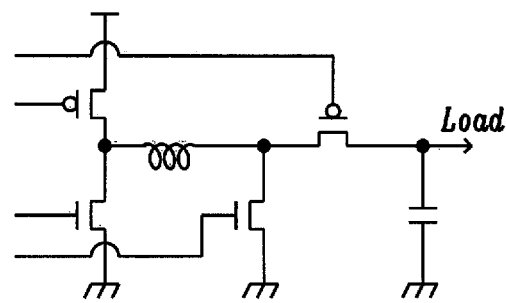

Regulators 20, 30 and 40 each have a buck type output circuit as shown in FIG. 5B between the analog control circuits 26 and the regulator load. The buck type driver circuit can be replaced by the boost driver circuit of FIG. 5A or the buck-boost driver circuit of FIG. 5C by adapting each driver circuit to the analog control circuit 26.

While the disclosure has been particularly shown and described with reference to preferred embodiments thereof, it will be understood by those skilled in the art that various changes in form and details may be made without departing from the spirit and scope of the disclosure.

What is claimed is:

1. A method for mode change of a switching regulator, comprising:
  a) creating in an internal register output voltage targets comprising an individually trimmable high voltage target (Vhigh) and an individually trimmable low voltage target (Vlow) of the switching regulator, which are applied in an output voltage range of the switching regulator between a minimum voltage (Vmin) to a maximum voltage (Vmax), wherein an output voltage target (V-Target), the high threshold voltage target (V-high) and the low threshold voltage target (V-low) are each separately held in a dedicated internal register;
  b) adjusting the value of the output voltage targets; and
  c) operating said regulator in modes depending upon results of comparisons of said high voltage target (Vhigh) with said output voltage target (V-Target) and of said low-voltage target (Vlow) with said output voltage target (V-Target), wherein
  1) Vmax greater than Vhigh greater than Vlow greater than Vmin;
  2) said switching regulator in a forced sync mode between Vmax and Vhigh wherein the forced sync mode is a normal operating mode;
  3) said switching regulator in a forced sleep mode between Vlow and Vmin; and
  4) said switching regulator in automatic mode between Vhigh and Vlow, wherein said automatic mode is decided according to output current of the switching regulator;
or wherein
  1) Vmax greater than Vlow greater than Vhigh greater than Vmin;
  2) said switching regulator in a forced sync mode between Vlow and Vmax wherein the forced sync mode is a normal operating mode;
  3) said switching regulator in a forced sleep mode between Vhigh and Vmin; and
  4) said switching regulator either in forced sync or in forced sleep modes between Vlow and Vhigh, wherein an actual mode of operation depends on a previous operation mode exhibiting a hysteresis effect between Vlow and Vhigh, wherein, if previous operation mode is forced sleep mode, the converter remains in forced sleep mode as long as Vhigh<Vtarget<Vlow, or, if previous operation is forced sync mode, the converter remains in forced sync mode as long as Vhigh<Vtarget<Vlow.

2. A switching regulator, comprising:
  a) an individually trimmable low threshold voltage target (Vlow) and an individually trimmable high threshold voltage target (Vhigh) established both in an internal register of said switching regulator;
  b) said Vlow and Vhigh register settings establish when output voltage mode changes are to occur; and
  c) said low and high threshold voltage settings adjusted between a minimum value (Vmin) and a maximum value (Vmax) of output voltages of said regulator to establish modes of operation;
wherein an output voltage target (V-Target), the high threshold voltage target (V-high) and the low threshold voltage (V-low) are each separately held in a dedicated internal register, wherein the mode of operation between Vhigh and Vmax forces a sync operation mode, while operation between Vlow and Vmin forces a sleep mode, and if Vhigh>Vlow between Vhiqh and Vlow an automatic mode is created, wherein the operation mode is decided by an output current of the switching regulator, and if Vlow>Vhigh the operation mode is decided by previous state, sync or sleep mode, according to hysteresis.

3. The method of claim 1, wherein the trimming of the high and low voltage thresholds is performed by using OTP device (one time programmable device), EEPROM (Electrically Erasable Programmable Read-Only Memory), or a fuse after fabrication, or make a modification using an i2C interface or any other digital interface.

4. The switching regulator of claim 2, wherein the trimming of the high and low voltage thresholds is performed by using OTP device (one time programmable device), EEPROM (Electrically Erasable Programmable Read-Only Memory), or a fuse after fabrication, or make a modification using an i2C interface or any other digital interface.

5. A method for mode change of a switching regulator, comprising:
  a) creating in an internal register output voltage targets comprising an individually trimmable high voltage target (Vhigh) and an individually trimmable low voltage target (Vlow) of the switching regulator, which are applied in an output voltage range of the switching regulator between a minimum voltage (Vmin) to a maximum voltage (Vmax), wherein an output voltage target (V-Target), the high output voltage target (V-high) and the low output voltage target (V-low) are each separately held in a dedicated internal register;
  b) adjusting the value of the output voltage targets; and
  c) operating said regulator in modes depending upon results of comparisons of said high voltage target (Vhigh) with said output voltage target (V-Target) and of said low-voltage target (Vlow) with said output voltage target (V-Target), wherein
  1) Vmax greater than Vhigh greater than Vlow, wherein Vlow equals Vmin;
  2) said switching regulator in a forced sync mode between Vhigh and Vmax wherein the forced sync mode is a normal operating mode; and
  3) said switching regulator in an automatic mode between Vhigh and Vmin, wherein the automatic mode decided by output current of the switching regulator;
or wherein
  1) Vmax equals Vhigh greater than Vlow greater than Vmin;
  2) said switching regulator in an automatic mode between Vlow and Vmax, wherein the automatic mode decided by output current of the switching regulator; and 3) said switching regulator in a sleep mode between Vlow and Vmin.

6. A method for mode change of a switching regulator, comprising:
- a) creating in an internal register output voltage targets comprising an individually trimmable high voltage target (Vhigh) and an individually trimmable low voltage target (Vlow) of the switching regulator, which are applied in an output voltage range of the switching regulator between a minimum voltage (Vmin) to a maximum voltage (Vmax), wherein an output voltage target (V-Target), the high output voltage target (V-high) and the low output voltage target (V-low) are each separately held in a dedicated internal register;
- b) adjusting the value of the output voltage targets; and
- c) operating said regulator in modes depending upon results of comparisons of said high voltage target (Vhigh) with said output voltage target (V-Target) and of said low-voltage target (Vlow) with said output voltage target (V-Target), wherein
  1) Vmax equal to Vhigh greater than Vlow, wherein Vlow equals Vmin; and
  2) said switching regulator in an automatic mode between Vmax and Vmin, wherein the automatic mode decided by output current of the switching regulator;

or wherein
  1) Vmax greater than Vhigh, wherein Vhigh equals Vlow and equals Vmin; and
  2) said switching regulator in a forced sync mode between Vmax and Vmin, wherein the forced sync mode is a normal operating mode;

or wherein
  1) Vmax and Vlow equal to Vmax, wherein Vlow greater than Vmin; and
  2) said switching regulator in a forced sleep mode between Vmax and Vmin.

7. A switching regulator, comprising:
- a) an individually trimmable low threshold voltage target (Vlow) and an individually trimmable high threshold voltage target (Vhigh) established both in an internal register of said switching regulator;
- b) said Vlow and (Vhigh) register settings establish when output voltage mode changes are to occur; and
- c) said low and high threshold voltage settings adjusted between a minimum value (Vmin) and a maximum value (Vmax) of output voltages of said regulator to establish modes of operation;

wherein an output voltage target (V-Target), the high threshold voltage target (V-high) and the low treshold voltage (V-low) are each separately held in a dedicated internal register, wherein the mode of operation between Vhigh and Vmax forces a normal operation, and operation between Vhigh and Vmin creates an automatic mode when Vlow equals Vmin, wherein the automatic mode is decided by output current of the switching regulator, or wherein the mode of operation between Vmax and Vlow forces an automatic mode when Vhigh equals Vmax and operation between Vlow and Vmin forces a forced sleep mode.

8. A switching regulator, comprising:
- a) an individually trimmable low threshold voltage target (Vlow) and an individually trimmable high threshold voltage target (Vhigh) established both in an internal register of said switching regulator;
- b) said Vlow and (Vhigh) register settings establish when output voltage mode changes are to occur; and
- c) said low and high threshold voltage settings adjusted between a minimum value (Vmin) and a maximum value (Vmax) of output voltages of said regulator to establish modes of operation;

wherein an output voltage target (V-Target), the high threshold voltage target (V-high) and the low threshold voltage (V-low) are each separately held in a dedicated internal register, wherein the mode of operation between Vmax and Vmin is in automatic mode when Vhigh equals Vmax and Vlow equals Vmin, or, wherein the mode of operation is forced to be normal mode between Vmin and Vmax, wherein Vhigh and Vlow equal Vmin, or, wherein the mode of operation is forced to be in sleep mode between Vmin and Vmax, when Vhigh and Vlow equal Vmax.

\* \* \* \* \*